(12) United States Patent
Gao et al.

(10) Patent No.: US 11,765,787 B2
(45) Date of Patent: *Sep. 19, 2023

(54) ENTITY CONFIGURATION METHOD, DEVICE AND SYSTEM, AND CU-U

(71) Applicant: ZTE CORPORATION, Guangdong (CN)

(72) Inventors: Yin Gao, Shenzhen (CN); Qingchun He, Shenzhen (CN); He Huang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/328,461

(22) Filed: May 24, 2021

(65) Prior Publication Data

US 2021/0282221 A1 Sep. 9, 2021

Related U.S. Application Data

(63) Continuation of application No. 16/511,817, filed on Jul. 15, 2019, now Pat. No. 11,019,680, which is a
(Continued)

(30) Foreign Application Priority Data

Jan. 16, 2017 (CN) .......................... 201710032552.4

(51) Int. Cl.
*H04W 80/08* (2009.01)
*H04W 76/18* (2018.01)
(Continued)

(52) U.S. Cl.
CPC ....... *H04W 80/08* (2013.01); *H04W 28/0268* (2013.01); *H04W 76/11* (2018.02); *H04W 76/18* (2018.02); *H04W 80/02* (2013.01)

(58) Field of Classification Search
CPC ..... H04W 80/08; H04W 76/18; H04W 76/11; H04W 28/0268; H04W 80/02
(Continued)

(56) References Cited

U.S. PATENT DOCUMENTS 11,019,680 B2 * 5/2021 Gao ...................... H04W 76/18
2013/0029588 A1 1/2013 Bienas et al.
(Continued)

FOREIGN PATENT DOCUMENTS

CN 103945559 A 7/2014
CN 104519529 A 4/2015
(Continued)

OTHER PUBLICATIONS

Extended European Search Report for EP Appl. No. 17890976.8, dated Sep. 18, 2020.
(Continued)

*Primary Examiner* — Nghi H Ly
(74) *Attorney, Agent, or Firm* — Foley & Lardner LLP

(57) ABSTRACT

Provided are an entity configuration method, device and system, a gNB-CU-User Plane (gNB-CU-UP). The entity configuration method includes: acquiring, through an Xn interface, specified information for configuring each packet data convergence protocol (PDCP) entity for processing a data radio bearer, where the Xn interface is an interface between a gNB-CU-Control Plane (gNB-CU-CP) and a gNB-CU-UP; and configuring the each PDCP entity according to the specified information. The present disclosure solves the problem of how to implement configuration of a gNB-CU-UP protocol entity and achieves centralized traffic convergence.

14 Claims, 6 Drawing Sheets

Related U.S. Application Data continuation of application No. PCT/CN2017/114952, filed on Dec. 7, 2017.

(51) Int. Cl.
*H04W 76/11* (2018.01)
*H04W 28/02* (2009.01)
*H04W 80/02* (2009.01)

(58) Field of Classification Search
USPC .............. 370/329, 328, 338, 341, 345, 350
See application file for complete search history.

(56) References Cited

U.S. PATENT DOCUMENTS

| | | | |
|---|---|---|---|
| 2015/0043435 A1* | 2/2015 | Blankenship | H04W 76/15 370/329 |
| 2015/0139144 A1 | 5/2015 | Chai et al. | |
| 2016/0113058 A1 | 4/2016 | Jung et al. | |
| 2016/0135084 A1* | 5/2016 | Yi | H04W 12/033 370/466 |
| 2016/0142518 A1* | 5/2016 | Raina | H04L 69/04 370/230 |
| 2016/0143078 A1 | 5/2016 | Jeong | |
| 2016/0157188 A1 | 6/2016 | Larsson et al. | |
| 2018/0035436 A1* | 2/2018 | Sharma | H04W 72/542 |

FOREIGN PATENT DOCUMENTS

| | | |
|---|---|---|
| CN | 104735703 A | 6/2015 |
| CN | 105813213 A | 7/2016 |
| CN | 106102106 A | 11/2016 |
| CN | 106162730 A | 11/2016 |
| CN | 106211352 A | 12/2016 |
| EP | 2 922 240 A1 | 9/2015 |
| EP | 3 113 539 A1 | 1/2017 |

OTHER PUBLICATIONS

Iaesi et al: "Solutions for UP-CP separation in access network", 3GPP Draft; R3-Cedex, France (4 pages) Oct. 6, 2016 (Oct. 6, 2016).

Intel Corporation: "C-plane and U-plane separation in the next generation radio access network", 3GPP Draft; R3-161075, Cedex, France (3 pages) May 22, 2016.

International Search Report and Written Opinion for International Appl. No. PCT/CN2017/114952, dated Feb. 24, 2018.

Notice of Allowance on U.S. Appl. No. 16/511,817 dated Jan. 22, 2021.

First Office Action for CN Appl. No. 201710032552.4, dated Jul. 27, 2020 (with English translation, 17 pages).

Extended European Search Report for EP Appl. No. 22209835.2, dated May 8, 2023.

Iaesi et al., "Solutions for UP-CP separation in access network", 3GPP TSG-RAN WG3 Meeting #93bis, R3-162249, Oct. 14, 2016, Sophia Antipolis (4 pages).

Intel Corporation, "C-plane and U-plane separation in the next generation radio access network", 3GPP TSG RAN WG3 Meeting #92, R3-161075, Apr. 27, 2016, Nanjing, China (3 pages).

\* cited by examiner

ENTITY CONFIGURATION METHOD, DEVICE AND SYSTEM, AND CU-U

CROSS-REFERENCE TO RELATED APPLICATIONS

This application claims the benefit of priority under 35 U.S.C. § 120 as a continuation of U.S. Non-Provisional patent application Ser. No. 16/511,817, filed on Jul. 15, 2019, which is a continuation of PCT Patent Application No. PCT/CN2017/114952, filed on Dec. 7, 2017, which claims priority to Chinese patent application No. 201710032552.4, filed on Jan. 16, 2017, the entire disclosure of each of which is incorporated herein by reference in its entirety.

TECHNICAL FIELD

The present disclosure relates to the field of wireless communications and, in particular, to an entity configuration method, device and system, and a CU-U.

BACKGROUND

In the fifth generation (5G) mobile communications, massive connections and user's higher rate requirements pose a great challenge to transmission capacity of a common public radio interface (CPRI) between a building baseband unit (BBU) and a remote radio unit (RRU) in the Long Term Evolution (LTE). Because the CPRI is used for the transmission of an IQ signal subject to processing such as coding and modulation on a physical layer, higher requirements are imposed on a transmission delay and a bandwidth of the CPRI. When a 5G air interface has an increased rate of tens of Gbps, the demand for traffic of the CPRI will reach a Tbps level, which puts tremendous pressure on network deployment costs and difficulties. Therefore, in the 5G system, the manner to divide a fronthaul interface needs to be redefined. Various aspects such as transmission capacity, the transmission delay and deployment convenience need to be considered in terms of the division of the fronthaul interface. For example, considering the transmission through a non-ideal fronthaul interface, delay-insensitive network functions are implemented in a first network element such as a centralized unit (CU), delay-sensitive network functions are implemented in a second network element such as a distributed unit (DU). The transmission between the first network element and the second network element is performed through an ideal or non-ideal fronthaul interface. FIG. 1 is a schematic diagram of a fronthaul interface between a first network element and a second network element, as shown in FIG. 1.

A first protocol entity (such as a radio resource control (RRC) entity) is located in the first network element. The first protocol entity generates control signaling, maintains establishment and/or modification and/or release of a radio bearer, maintains parameter updates of a second protocol entity, a third protocol entity, a fourth protocol entity and a physical layer. The function of the second protocol entity is similar to or is an enhanced function of a Packet Data Convergence Protocol (PDCP) function in the LTE system. The user can define multiple PDCP entities and can configure each PDCP entity carrying user plane data. Each PDCP entity carries data of the radio bearer. According to different data carried by the radio bearers, the PDCP entity corresponds to a control plane or a user plane. The function of the third protocol entity is similar to and is an enhanced function of a radio link control (RLC) function of the LTE. The function of the fourth protocol entity is similar to and is an enhanced function of a medium access control (MAC) function of the LTE. The second network element includes at least one of: the second protocol entity, the third protocol entity, the fourth protocol entity, the physical layer and a radio frequency unit. The first network element communicates with the second network element through the fronthaul interface. FIG. 2 is a schematic diagram of possible function divisions between a first network element and a second network element. The possible function divisions of the separated CU and DU are as shown in FIG. 2.

It is to be noted that a control plane PDCP entity may be separated from a user plane PDCP entity in the CU, that is, the control plane PDCP entity and the user plane PDCP entity are located in two different CUs. For convenience of description, the two CUs are referred to as a gNB-CU-Control Plane (gNB-CU-CP) and a gNB-CU-User Plane (gNB-CU-UP), thereby separating user plane data from control plane data. FIG. 3 is a schematic diagram illustrating separation of control plane data and user plane data in a first network element, as shown in FIG. 3.

Assuming that an Xn interface exists between the gNB-CU-CP and the gNB-CU-UP, the fronthaul interface NGx exists between the CU and the DU, an interface between the gNB-CU-CP and the DU is referred to as NGx-C, and an interface between the gNB-CU-UP and the DU is referred to as NGx-U. Therefore, how to implement the configuration of a gNB-CU-UP protocol entity is a problem to be currently solved.

In view of the above technical problem in the related art, no effective solution has yet been proposed.

SUMMARY

Embodiments of the present disclosure provide an entity configuration method, device and system, and a gNB-CU-UP to solve at least the problem of how to implement configuration of a gNB-CU-UP protocol entity in the related art.

An embodiment of the present disclosure provides an entity configuration method. The method includes: acquiring specified information for configuring each PDCP entity for processing a edata radio bearer through an Xn interface, where the Xn interface is an interface between a gNB-CU-CP and a gNB-CU-UP; and configuring the each PDCP entity according to the specified information.

An embodiment of the present disclosure provides an entity configuration device including an acquisition module and a configuration module. The acquisition module is configured to acquire specified information for configuring each PDCP entity for processing a data radio bearer through an Xn interface, where the Xn interface is an interface between a gNB-CU-CP and a gNB-CU-UP. The configuration module is configured to configure the each PDCP entity according to the specified information.

An embodiment of the present disclosure provides a gNB-CU-UP including a radio frequency (RF) module and a processor. The RF module is configured to acquire specified information for configuring each PDCP entity for processing a data radio bearer through an Xn interface, where the Xn interface is an interface between a gNB-CU-CP and the gNB-CU-UP. The processor is configured to configure the each PDCP entity according to the specified information.

An embodiment of the present disclosure provides an entity configuration system including a gNB-CU-CP, a gNB-CU-UP and an Xn interface. The Xn interface is an interface between the gNB-CU-CP and the gNB-CU-UP. The gNB- CU-CP is configured to transmit specified information for configuring each PDCP entity for processing a data radio bearer to the gNB-CU-UP through the Xn interface. The gNB-CU-UP is configured to receive the specified information and configure the each PDCP entity according to the specified information.

Another embodiment of the present disclosure further provides a storage medium. The storage medium is configured to store program codes for executing the following steps: acquiring specified information for configuring each PDCP entity for processing a data radio bearer through an Xn interface, where the Xn interface is an interface between a gNB-CU-CP and a gNB-CU-UP; and configuring the each PDCP entity according to the specified information.

In the present disclosure, the specified information for configuring the each PDCP entity for processing the data radio bearer may be acquired through the Xn interface and the each PDCP entity may be configured according to the specified information so that configuration of a gNB-CU-UP protocol entity is implemented, thereby solving the problem of how to implement configuration of a gNB-CU-UP protocol entity and achieving centralized traffic convergence.

BRIEF DESCRIPTION OF DRAWINGS

The drawings described herein are used to provide a further understanding of the present disclosure, and form a part of the present application. The exemplary embodiments and descriptions thereof in the present disclosure are used to explain the present disclosure and do not limit the present disclosure in any improper way. In the drawings.

DETAILED DESCRIPTION

Hereinafter the present disclosure will be described in detail with reference to the drawings and in conjunction with embodiments. It is to be noted that if not in collision, the embodiments and features therein in the present application may be combined with each other.

It is to be noted that the terms "first", "second" and the like in the description, claims and above drawings of the present disclosure are used to distinguish between similar objects and are not necessarily used to describe a particular order or sequence.

Embodiment One

Figure 3:
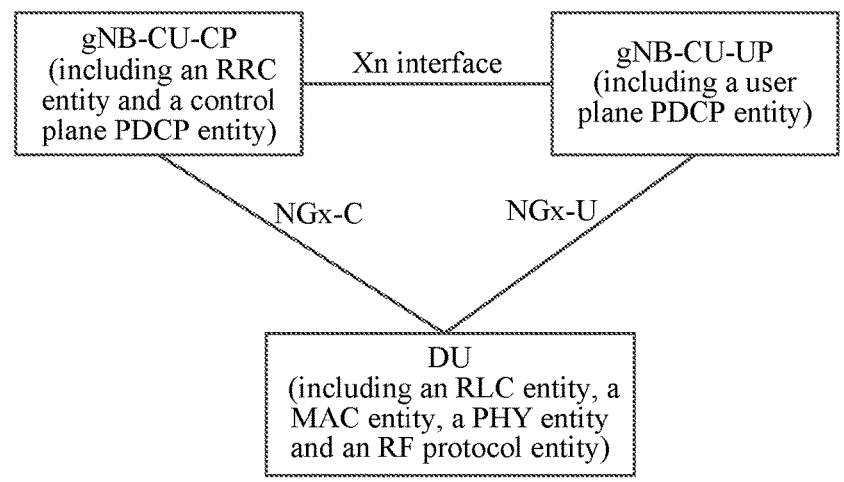
FIG. 3 is a schematic diagram illustrating separation of control plane data and user plane data in a first network element.
Figure 4:
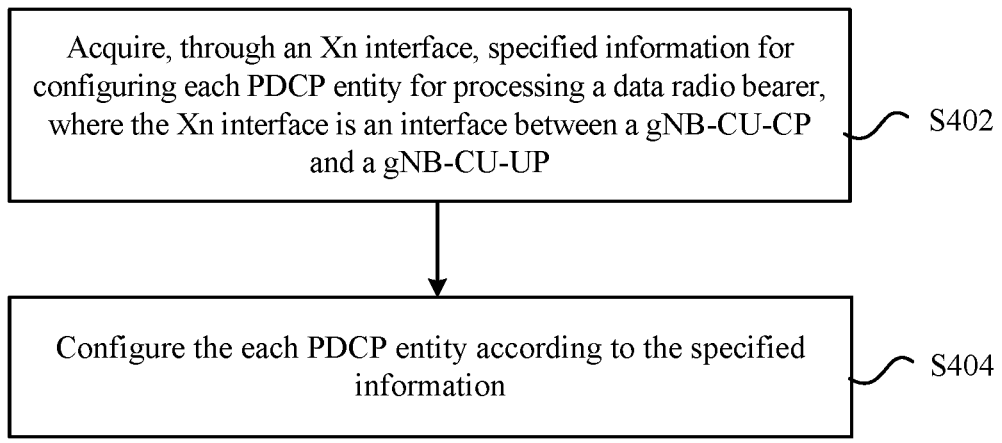
FIG. 4 is a flowchart of an entity configuration method according to an embodiment of the present disclosure.

This embodiment provides an entity configuration method executable on an architecture shown in FIG. 3. FIG. 4 is a flowchart of an entity configuration method according to an embodiment of the present disclosure. As shown in FIG. 4, the method includes steps described below.

In step S402, specified information for configuring each packet data convergence protocol (PDCP) entity for processing a data radio bearer is acquired through an Xn interface, where the Xn interface is an interface between a gNB-CU-Control Plane (gNB-CU-CP) and a gNB-CU-User Plane (gNB-CU-UP).

In step S404, the each PDCP entity is configured according to the specified information.

In the above steps, the specified information for configuring the each PDCP entity for processing the data radio bearer may be acquired through the Xn interface and the each PDCP entity may be configured according to the specified information so that configuration of a gNB-CU-UP protocol entity is implemented, thereby solving the problem of how to implement configuration of a gNB-CU-UP protocol entity and achieving centralized traffic convergence.

It is to be noted that the specified information may include at least one of: protocol data unit (PDU) session information and user plane configuration information.

It is to be noted that when the specified information includes the PDU session information, step S404 may be implemented by determining, according to the acquired PDU session information and a correspondence between the PDU session information and the user plane configuration information, the user plane configuration information corresponding to the acquired PDU session information; and configuring the each PDCP entity according to the user plane configuration information corresponding to the acquired PDU session information.

Optionally, in condition that the specified information includes the user plane configuration information, step S404 may be implemented by directly configuring the each PDCP entity according to the user plane configuration information.

It is to be noted that the PDU session information may be PDU session information in one of the following flows: a PDU session establishment flow, a PDU session modification flow and a PDU session deletion flow.

In an embodiment of the present disclosure, when the PDU session information is information required to establish a PDU session in the PDU session establishment flow, the PDU session information may include at least one of: a session identifier (ID), IDs of one or more data streams in a single session, quality of service (QoS) information of non-guaranteed bit rate (non-GBR) traffic corresponding to the one or more data streams, QoS information of guaranteed bit rate (GBR) traffic corresponding to the one or more data streams, and flag information for the Xn interface to identify a terminal.

It is to be noted that after step S404, the method may further include transmitting a PDU session establishment success message to the gNB-CU-CP, or transmitting a PDU session establishment failure message to the gNB-CU-CP.

The PDU session establishment success message carries information of a successfully configured PDU session, where the information of information of the successfully configured PDU session includes at least one of: the session ID, IDs of one or more data streams with a user plane configuration success in the single session, the flag information for the Xn interface to identify the terminal, IDs of one or more data streams with a user plane configuration failure in the single session and a configuration failure reason. The PDU session establishment failure message includes at least one of: a user plane configuration failure reason, and the flag information for the Xn interface to identify the terminal.

In an embodiment of the present disclosure, when the PDU session information is information of information of a PDU session to be modified in the PDU session modification flow, the PDU session information may include at least one of: a session ID, IDs of one or more data streams to be added in a single session, QoS information of non-GBR traffic corresponding to the one or more data streams to be added, QoS information of GBR traffic corresponding to the one or more data streams to be added, IDs of one or more data streams to be modified in the single session, QoS information of non-GBR traffic corresponding to the one or more data streams to be modified, QoS information of GBR traffic corresponding to the one or more data streams to be modified, IDs of one or more data streams to be deleted in the single session, and the flag information for the Xn interface to identify the terminal.

It is to be noted that configuration may include at least one of addition, modification and deletion.

It is to be noted that after step S404, the method may further include: transmitting a PDU session modification success message to the gNB-CU-CP, or transmitting a PDU session modification failure message to the gNB-CU-CP. The PDU session modification success message carries information of a successfully modified PDU session, where the information of the successfully modified PDU session includes at least one of: the session ID, IDs of one or more data streams with a user plane configuration modification success in the single session, IDs of one or more data streams with a user plane configuration modification failure in the single session, a modification failure reason and the flag information for the Xn interface to identify the terminal. The PDU session modification failure message includes a user plane configuration failure reason in the PDU session and the flag information for the Xn interface to identify the terminal.

In an embodiment of the present disclosure, when the PDU session information is information of a PDU session to be deleted in the PDU session deletion flow, the PDU session information includes at least one of: a session ID, a session deletion reason and the flag information for the Xn interface to identify the terminal.

It is to be noted that after step S404, the method may further include transmitting a PDU session deletion success message to the gNB-CU-CP. The PDU session deletion success message includes at least one of: an ID of a successfully deleted session and the flag information for the Xn interface to identify the terminal.

It is to be noted that the user plane configuration information may also be user plane configuration information in one of the following flows: the PDU session establishment flow, the PDU session modification flow and the PDU session deletion flow.

It is to be noted that the user plane configuration information may be transmitted through a newly defined Xn AP message in a plaintext manner, or may also be transmitted through the Xn AP message in a container manner, but it is not limited thereto.

In an embodiment of the present disclosure, the user plane configuration information is information of user plane configuration in the PDU session establishment flow, and the user plane configuration information includes at least one of: an index ID of each PDCP entity to be configured and configuration information of the each PDCP entity to be configured.

It is to be noted that the configuration information of the each PDCP entity to be configured includes at least one of: whether header compression is required for a PDCP used by the each PDCP entity to be configured, data encryption key information, a discard timer of a PDCP service data unit (SDU), radio link control (RLC) layer configuration information, medium access control (MAC) layer configuration information and physical layer configuration information.

It is to be noted that after step S404, the method may further include transmitting a configuration completion confirmation message to the gNB-CU-CP, or transmitting configuration failure information to the gNB-CU-CP. The configuration completion confirmation message includes index information of one or more successfully configured PDCP entities. The configuration failure information includes the configuration failure reason.

It is to be noted that step S402 may be implemented by acquiring the specified information from the gNB-CU-CP through the Xn interface, where the specified information includes PDU session related information. The PDU session related information is acquired by the gNB-CU-CP from a core network through an NG interface, and the PDU session related information includes at least one of: the session ID, the IDs of the one or more data streams in the single session, the QoS information of the non-GBR traffic corresponding to the one or more data streams and the QoS information of the GBR traffic corresponding to the one or more data streams. The NG interface is an interface between the gNB-CU-UP and the core network.

In an embodiment of the present disclosure, the user plane configuration information is information of user plane configuration to be modified in the PDU session modification flow, and the user plane configuration information may include at least one of: an index ID of each PDCP entity to be added, configuration information of the each PDCP entity to be added, an index ID of each PDCP entity to be modified, configuration information of the each PDCP entity to be modified and an index ID of each PDCP entity to be deleted.

It is to be noted that the configuration information of the each PDCP entity to be added may include at least one of: whether the header compression is required for a PDCP used by the each PDCP entity to be added, the data encryption key information, the discard timer of the PDCP SDU, the RLC layer configuration information, the MAC layer configuration information and the physical layer configuration information; and the configuration information of the each PDCP entity to be modified may include at least one of: whether the header compression is required for the PDCP used by the each PDCP entity to be added, the data encryption key information, the discard timer of the PDCP SDU, the RLC layer configuration information, the MAC layer configuration information and the physical layer configuration information.

It is to be noted that after step S404, the method may further include transmitting the configuration completion confirmation message to the gNB-CU-CP, or transmitting the configuration failure information to the gNB-CU-CP.

The configuration completion confirmation message includes index information of one or more successfully configured PDCP entities, index information of one or more PDCP entities with a configuration modification failure and the modification failure reason. The configuration failure information includes the configuration failure reason.

It is to be noted that step S402 may be implemented by acquiring the specified information from the gNB-CU-CP through the Xn interface, where the specified information includes PDU session modification related information. The PDU session modification related information is acquired by the gNB-CU-CP from the core network through the NG interface, and the PDU session modification related information includes at least one of: the session ID, the IDs of the one or more data streams to be added in the single session, the QoS information of the non-GBR traffic corresponding to the one or more data streams to be added, the QoS information of the GBR traffic corresponding to the one or more data streams to be added, the IDs of the one or more data streams to be modified in the single session, the QoS information of the non-GBR traffic corresponding to the one or more data streams to be modified, the QoS information of the GBR traffic corresponding to the one or more data streams to be modified and the IDs of the one or more data streams to be deleted in the single session.

In an embodiment of the present disclosure, the user plane configuration information is information of user configuration to be deleted in the PDU session deletion flow, and the user plane configuration information may include at least one of: an index ID of each PDCP entity to be deleted and a deletion reason.

It is to be noted that after step S402, the method may further include transmitting a user plane configuration deletion success message to the gNB-CU-CP. The user plane configuration deletion success message includes index IDs of successfully deleted PDCP entities.

It is to be noted that step S402 may be implemented by acquiring, through the Xn interface, the specified information from the gNB-CU-CP, where the specified information includes PDU session deletion related information. The PDU session deletion related information is acquired by the gNB-CU-CP from the core network through the NG interface, and the PDU session deletion related information includes at least one of: the session ID and the session deletion reason.

Optionally, the preceding steps may, but may not necessarily, be executed by the gNB-CU-UP. From the description of the embodiment described above, it will be apparent to those skilled in the art that the method in the embodiment described above may be implemented by software plus a necessary general-purpose hardware platform, or may of course be implemented by hardware. However, in many cases, the former is a preferred implementation mode. Based on this understanding, the solutions provided by the present disclosure substantially, or the part contributing to the related art, may be embodied in the form of a software product. The computer software product is stored in a storage medium (such as a read-only memory (ROM)/a random access memory (RAM), a magnetic disk or an optical disk) and includes several instructions for enabling terminal equipment (which may be a mobile phone, a computer, a server, network equipment, or the like) to execute the method according to each embodiment of the present disclosure.

Embodiment Two

This embodiment further provides an entity configuration device configured to implement the above-mentioned embodiment and preferred implementation modes. What has been described will not be repeated. As used below, the term "module" may be software, hardware or a combination thereof capable of implementing predetermined functions. The device in the embodiment described below is preferably implemented by software, but implementation by hardware or by a combination of software and hardware is also possible and conceived.

Figure 5:
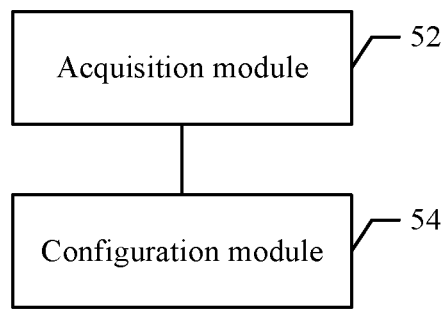
FIG. 5 is a block diagram of an entity configuration device according to an embodiment of the present disclosure.

FIG. 5 is a block diagram of an entity configuration device according to an embodiment of the present disclosure. As shown in FIG. 5, the device includes an acquisition module 52 and a configuration module 54.

The acquisition module 52 is configured to acquire specified information for configuring each packet data convergence protocol (PDCP) entity for processing a data radio bearer through an Xn interface, where the Xn interface is an interface between a gNB-CU-Control Plane (gNB-CU-CP) and a gNB-CU-User Plane (gNB-CU-UP).

The configuration module 54 is connected to the acquisition module 52 and is configured to configure the each PDCP entity according to the specified information.

In the above device, the specified information for configuring the each PDCP entity for processing the data radio bearer may be acquired through the Xn interface and the each PDCP entity may be configured according to the specified information so that configuration of a gNB-CU-UP protocol entity is implemented, thereby solving the problem of how to implement configuration of a gNB-CU-UP protocol entity and achieving centralized traffic convergence.

It is to be noted that the specified information may include at least one of: protocol data unit (PDU) session information and user plane configuration information.

It is to be noted that when the specified information includes the PDU session information, the configuration module 54 may be further configured to determine, according to the acquired PDU session information and a correspondence between the PDU session information and the user plane configuration information, the user plane configuration information corresponding to the acquired PDU session information; and configure the each PDCP entity according to the user plane configuration information corresponding to the acquired PDU session information.

It is to be noted that when the specified information includes the user plane configuration information, the configuration module 54 may be further configured to directly configure the each PDCP entity according to the user plane configuration information.

It is to be noted that the PDU session information may be PDU session information in one of the following flows: a PDU session establishment flow, a PDU session modification flow and a PDU session deletion flow.

In an embodiment of the present disclosure, when the PDU session information is information required to establish a PDU session in the PDU session establishment flow, the PDU session information may include at least one of: a session identifier (ID), IDs of one or more data streams in a single session, quality of service (QoS) information of non-guaranteed bit rate (non-GBR) traffic corresponding to the one or more data streams, QoS information of guaranteed bit rate (GBR) traffic corresponding to the one or more data streams, and flag information for the Xn interface to identify a terminal.

It is to be noted that the device may further include a first transmitting module connected to the configuration module 54. After the each PDCP entity is configured according to the specified information, the first transmitting module is configured to transmit a PDU session establishment success message to the gNB-CU-CP, or transmit a PDU session establishment failure message to the gNB-CU-CP. The PDU session establishment success message carries information of a successfully configured PDU session, where the information of the successfully configured PDU session includes at least one of: the session ID, IDs of one or more data streams with a user plane configuration success in the single session, the flag information for the Xn interface to identify the terminal, IDs of one or more data streams with a user plane configuration failure in the single session and a configuration failure reason. The PDU session establishment failure message includes at least one of: a user plane configuration failure reason and the flag information for the Xn interface to identify the terminal.

In an embodiment of the present disclosure, when the PDU session information is information of a PDU session to be modified in the PDU session modification flow, the PDU session information may include at least one of: a session ID, IDs of one or more data streams to be added in a single session, QoS information of non-GBR traffic corresponding to the one or more data streams to be added, QoS information of GBR traffic corresponding to the one or more data streams to be added, IDs of one or more data streams to be modified in the single session, QoS information of non-GBR traffic corresponding to the one or more data streams to be modified, QoS information of GBR traffic corresponding to the one or more data streams to be modified, IDs of one or more data streams to be deleted in the single session and the flag information for the Xn interface to identify the terminal.

It is to be noted that configuration includes at least one of addition, modification and deletion.

It is to be noted that the device may further include a second transmitting module connected to the configuration module 54. After the each PDCP entity is configured according to the specified information, the second transmitting module is configured to transmit a PDU session modification success message to the gNB-CU-CP, or transmit a PDU session modification failure message to the gNB-CU-CP. The PDU session modification success message carries information of a successfully modified PDU session, where the information of the successfully modified PDU session includes at least one of: the session ID, IDs of one or more data streams with a user plane configuration modification success in the single session, IDs of one or more data streams with a user plane configuration modification failure in the single session, a modification failure reason and the flag information for the Xn interface to identify the terminal. The PDU session modification failure message includes a user plane configuration failure reason in the PDU session and the flag information for the Xn interface to identify the terminal.

In an embodiment of the present disclosure, in condition that the PDU session information is information of a PDU session to be deleted in the PDU session deletion flow, the PDU session information may include at least one of: a session ID, a session deletion reason and the flag information for the Xn interface to identify the terminal.

It is to be noted that the device may further include a third transmitting module connected to the configuration module 54. After the each PDCP entity is configured according to the specified information, the third transmitting module is configured to transmit a PDU session deletion success message to the gNB-CU-CP. The PDU session deletion success message includes at least one of: an ID of a successfully deleted session and the flag information for the Xn interface to identify the terminal.

It is to be noted that the user plane configuration information may also be user plane configuration information in one of the following flows: the PDU session establishment flow, the PDU session modification flow and the PDU session deletion flow.

It is to be noted that the user plane configuration information may be transmitted through a newly defined Xn AP message in a plaintext manner, or may also be transmitted through the Xn AP message in a container manner, but it is not limited thereto.

In an embodiment of the present disclosure, the user plane configuration information functions in the PDU session establishment flow, and the user plane configuration information includes at least one of: an index ID of each PDCP entity to be configured and configuration information of the each PDCP entity to be configured.

It is to be noted that the configuration information of the each PDCP entity to be configured includes at least one of: whether header compression is required for a PDCP used by the each PDCP entity to be configured, data encryption key information, a discard timer of a PDCP service data unit (SDU), radio link control (RLC) layer configuration information, medium access control (MAC) layer configuration information and physical layer configuration information.

It is to be noted that the device may further include a fourth transmitting module connected to the configuration module 54. After the each PDCP entity is configured according to the specified information, the fourth transmitting module is configured to transmit a configuration completion confirmation message to the gNB-CU-CP, or transmit configuration failure information to the gNB-CU-CP. The configuration completion confirmation message includes index information of one or more successfully configured PDCP entities. The configuration failure information includes the configuration failure reason.

It is to be noted that the acquisition module 52 may be further configured to acquire the specified information from the gNB-CU-CP through the Xn interface, where the specified information includes PDU session related information. The PDU session related information is acquired by the gNB-CU-CP from a core network through an NG interface, and the PDU session related information includes at least one of: the session ID, the IDs of the one or more data streams in the single session, the QoS information of the non-GBR traffic corresponding to the one or more data streams and the QoS information of the GBR traffic corresponding to the one or more data streams. The NG interface is an interface between the gNB-CU-UP and the core network.

In an embodiment of the present disclosure, the user plane configuration information is information of user plane configuration to be modified in the PDU session modification flow, and the user plane configuration information includes at least one of: an index ID of each PDCP entity to be added, configuration information of the each PDCP entity to be added, an index ID of each PDCP entity to be modified, configuration information of the each PDCP entity to be modified and an index ID of each PDCP entity to be deleted.

It is to be noted that the configuration information of the each PDCP entity to be added includes at least one of: whether the header compression is required for a PDCP used by the each PDCP entity to be added, the data encryption key information, the discard timer of the PDCP SDU, the RLC layer configuration information, the MAC layer configuration information and the physical layer configuration information; and the configuration information of the each PDCP entity to be modified includes at least one of: whether the header compression is required for the PDCP used by the each PDCP entity to be modified, the data encryption key information, the discard timer of the PDCP SDU, the RLC layer configuration information, the MAC layer configuration information and the physical layer configuration information.

It is to be noted that the device may further include a fifth transmitting module connected to the configuration module 54. After the each PDCP entity is configured according to the specified information, the fifth transmitting module is configured to transmit the configuration completion confirmation message to the gNB-CU-CP, or transmit the configuration failure information to the gNB-CU-CP. The configuration completion confirmation message includes index information of one or more successfully configured PDCP entities, index information of one or more PDCP entities with a configuration modification failure and the modification failure reason. The configuration failure information includes the configuration failure reason.

It is to be noted that the acquisition module 52 may be further configured to acquire, through the Xn interface, the specified information from the gNB-CU-CP, where the specified information includes PDU session modification related information. The PDU session modification related information is acquired by the gNB-CU-CP from the core network through the NG interface, and the PDU session modification related information includes at least one of: the session ID, the IDs of the one or more data streams to be added in the single session, the QoS information of the non-GBR traffic corresponding to the one or more data streams to be added, the QoS information of the GBR traffic corresponding to the one or more data streams to be added, the IDs of the one or more data streams to be modified in the single session, the QoS information of the non-GBR traffic corresponding to the one or more data streams to be modified, the QoS information of the GBR traffic corresponding to the one or more data streams to be modified and the IDs of the one or more data streams to be deleted in the single session.

In an embodiment of the present disclosure, the user plane configuration information is information of user configuration to be deleted in the PDU session deletion flow, and the user plane configuration information may include at least one of: an index ID of each PDCP entity to be deleted and a deletion reason.

It is to be noted that the device may further include a sixth transmitting module connected to the configuration module 54. After the each PDCP entity is configured according to the specified information, the sixth transmitting module is configured to transmit a user plane configuration deletion success message to the gNB-CU-CP. The user plane configuration deletion success message includes index IDs of successfully deleted PDCP entities.

It is to be noted that the acquisition module 52 may be further configured to acquire, through the Xn interface, the specified information from the gNB-CU-CP, where the specified information includes PDU session deletion related information. The PDU session deletion related information is acquired by the gNB-CU-CP from the core network through the NG interface, and the PDU session deletion related information includes at least one of: the session ID and the session deletion reason.

It is to be noted that the preceding device may, but may not necessarily, be disposed in the gNB-CU-UP.

It is to be noted that the various modules described above may be implemented by software or hardware. Implementation by hardware may, but may not necessarily, be performed in the following manners: the various modules described above are located in a same processor, or the various modules described above are located in their respective processors in any combination form.

Embodiment Three

Figure 6:
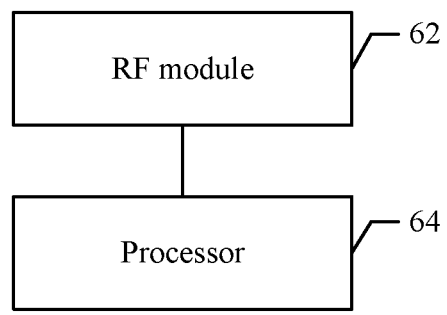
FIG. 6 is a block diagram of a gNB-CU-UP according to an embodiment of the present disclosure.

An embodiment of the present disclosure further provides a gNB-CU-User Plane (gNB-CU-UP). FIG. 6 is a block diagram of a gNB-CU-UP according to an embodiment of the present disclosure. As shown in FIG. 6, the gNB-CU-UP includes a radio frequency (RF) module 62 and a processor 64.

The RF module 62 is configured to acquire specified information for configuring each packet data convergence protocol (PDCP) entity for processing a data radio bearer through an Xn interface, where the Xn interface is an interface between a gNB-CU-Control Plane (gNB-CU-CP) and the gNB-CU-UP.

The processor 64 is connected to the RF module 62 and is configured to configure the each PDCP entity according to the specified information.

In the above gNB-CU-UP, the specified information for configuring the each PDCP entity for processing the data radio bearer may be acquired through the Xn interface and the each PDCP entity may be configured according to the specified information so that configuration of a gNB-CU-UP protocol entity is implemented, thereby solving the problem of how to implement configuration of a gNB-CU-UP protocol entity and achieving centralized traffic convergence.

It is to be noted that the specified information may include at least one of: protocol data unit (PDU) session information and user plane configuration information.

Optionally, when the specified information includes the PDU session information, the processor 64 may be further configured to determine, according to the acquired PDU session information and a correspondence between the PDU session information and the user plane configuration information, the user plane configuration information corresponding to the acquired PDU session information; and configure the each PDCP entity according to the user plane configuration information corresponding to the acquired PDU session information.

It is to be noted that when the specified information includes the user plane configuration information, the processor 64 may be further configured to directly configure the each PDCP entity according to the user plane configuration information.

It is to be noted that the PDU session information may be PDU session information in one of the following flows: a PDU session establishment flow, a PDU session modification flow and a PDU session deletion flow.

In an embodiment of the present disclosure, when the PDU session information is information required to establish a PDU session in the PDU session establishment flow, the PDU session information includes at least one of: a session identifier (ID), IDs of one or more data streams in a single session, quality of service (QoS) information of non-guaranteed bit rate (non-GBR) traffic corresponding to the one or more data streams, QoS information of guaranteed bit rate (GBR) traffic corresponding to the one or more data streams and flag information for the Xn interface to identify a terminal.

It is to be noted that after the each PDCP entity is configured according to the specified information, the RF module 62 may be further configured to transmit a PDU session establishment success message to the gNB-CU-CP, or transmit a PDU session establishment failure message to the gNB-CU-CP. The PDU session establishment success message carries information of a successfully configured PDU session, where the information of the successfully configured PDU session includes at least one of: the session ID, IDs of one or more data streams with a user plane configuration success in the single session, the flag information for the Xn interface to identify the terminal, IDs of one or more data streams with a user plane configuration failure in the single session and a configuration failure reason. The PDU session establishment failure message includes at least one of: a user plane configuration failure reason and the flag information for the Xn interface to identify the terminal.

In an embodiment of the present disclosure, in condition that the PDU session information is information of a PDU session to be modified in the PDU session modification flow, the PDU session information includes at least one of: a session ID, IDs of one or more data streams to be added in a single session, QoS information of non-GBR traffic corresponding to the one or more data streams to be added, QoS information of GBR traffic corresponding to the one or more data streams to be added, IDs of one or more data streams to be modified in the single session, QoS information of non-GBR traffic corresponding to the one or more data streams to be modified, QoS information of GBR traffic corresponding to the one or more data streams to be modified, IDs of one or more data streams to be deleted in the single session and the flag information for the Xn interface to identify the terminal.

It is to be noted that configuration includes at least one of addition, modification and deletion.

It is to be noted that after the each PDCP entity is configured according to the specified information, the RF module 62 may be further configured to transmit a PDU session modification success message to the gNB-CU-CP, or transmit a PDU session modification failure message to the gNB-CU-CP. The PDU session modification success message carries information of a successfully modified PDU session, where the information of the successfully modified PDU session includes at least one of: the session ID, IDs of one or more data streams with a user plane configuration modification success in the single session, IDs of one or more data streams with a user plane configuration modification failure in the single session, a modification failure reason and the flag information for the Xn interface to identify the terminal. The PDU session modification failure message includes a user plane configuration failure reason in the PDU session and the flag information for the Xn interface to identify the terminal.

In an embodiment of the present disclosure, when the PDU session information is information of a PDU session to be deleted in the PDU session deletion flow, the PDU session information includes at least one of: a session ID, a session deletion reason and the flag information for the Xn interface to identify the terminal.

It is to be noted that after the each PDCP entity is configured according to the specified information, the RF module is configured to transmit a PDU session deletion success message to the gNB-CU-CP. The PDU session deletion success message includes at least one of: an ID of a successfully deleted session and the flag information for the Xn interface to identify the terminal.

It is to be noted that the user plane configuration information may also be user plane configuration information in one of the following flows: the PDU session establishment flow, the PDU session modification flow and the PDU session deletion flow.

It is to be noted that the user plane configuration information may be transmitted through a newly defined Xn AP message in a plaintext manner, or may also be transmitted through the Xn AP message in a container manner, but it is not limited thereto.

In an embodiment of the present disclosure, the user plane configuration information functions in the PDU session establishment flow, and the user plane configuration information includes at least one of: an index ID of each PDCP entity to be configured and configuration information of the each PDCP entity to be configured.

It is to be noted that the configuration information of the each PDCP entity to be configured includes at least one of: whether header compression is required for a PDCP used by the each PDCP entity to be configured, data encryption key information, a discard timer of a PDCP service data unit (SDU), radio link control (RLC) layer configuration information, medium access control (MAC) layer configuration information and physical layer configuration information.

It is to be noted that after the each PDCP entity is configured according to the specified information, the RF module 62 may be further configured to transmit a configuration completion confirmation message to the gNB-CU-CP, or transmit configuration failure information to the gNB-CU-CP. The configuration completion confirmation message includes index information of one or more successfully configured PDCP entities. The configuration failure information includes the configuration failure reason.

It is to be noted that the RF module 62 may be further configured to acquire, through the Xn interface, the specified information from the gNB-CU-CP, where the specified information includes PDU session related information. The PDU session related information is acquired by the gNB-CU-CP from a core network through an NG interface, and the PDU session related information includes at least one of: the session ID, the IDs of the one or more data streams in the single session, the QoS information of the non-GBR traffic corresponding to the one or more data streams and the QoS information of the GBR traffic corresponding to the one or more data streams. The NG interface is an interface between the gNB-CU-UP and the core network.

In an embodiment of the present disclosure, the user plane configuration information is information of user plane configuration to be modified in the PDU session modification flow, and the user plane configuration information may include at least one of: an index ID of each PDCP entity to be added, configuration information of the each PDCP entity to be added, an index ID of each PDCP entity to be modified, configuration information of the each PDCP entity to be modified and an index ID of each PDCP entity to be deleted.

It is to be noted that the configuration information of the each PDCP entity to be added includes at least one of: whether the header compression is required for a PDCP used by the each PDCP entity to be added, the data encryption key information, the discard timer of the PDCP SDU, the RLC layer configuration information, the MAC layer configuration information and the physical layer configuration information; and the configuration information of the each PDCP entity to be modified includes at least one of: whether header compression is required for the PDCP used by the each PDCP entity to be modified, the data encryption key information, the discard timer of the PDCP SDU, the RLC layer configuration information, the MAC layer configuration information and the physical layer configuration information.

It is to be noted that after the each PDCP entity is configured according to the specified information, the RF module 62 may be further configured to transmit the configuration completion confirmation message to the gNB-CU-CP, or transmit the configuration failure information to the gNB-CU-CP. The configuration completion confirmation message includes index information of one or more successfully configured PDCP entities, index information of one or more PDCP entities with a configuration modification failure and the modification failure reason. The configuration failure information includes the configuration failure reason.

It is to be noted that the RF module 62 may be further configured to acquire, through the Xn interface, the specified information from the gNB-CU-CP, where the specified information includes PDU session modification related information. The PDU session modification related information is acquired by the gNB-CU-CP from the core network through the NG interface, and the PDU session modification related information includes at least one of: the session ID, the IDs of the one or more data streams to be added in the single session, the QoS information of the non-GBR traffic corresponding to the one or more data streams to be added, the QoS information of the GBR traffic corresponding to the one or more data streams to be added, the IDs of the one or more data streams to be modified in the single session, the QoS information of the non-GBR traffic corresponding to the one or more data streams to be modified, the QoS information of the GBR traffic corresponding to the one or more data streams to be modified and the IDs of the one or more data streams to be deleted in the single session.

In an embodiment of the present disclosure, the user plane configuration information is information of user configuration to be deleted in the PDU session deletion flow, and the user plane configuration information includes at least one of: an index ID of each PDCP entity to be deleted and a deletion reason.

It is to be noted that after the each PDCP entity is configured according to the specified information, the RF module 62 may be further configured to transmit a user plane configuration deletion success message to the gNB-CU-CP. The user plane configuration deletion success message includes index IDs of successfully deleted PDCP entities.

It is to be noted that the RF module 62 may be further configured to acquire, through the Xn interface, the specified information from the gNB-CU-CP, where the specified information includes PDU session deletion related information. The PDU session deletion related information is acquired by the gNB-CU-CP from the core network through the NG interface, and the PDU session deletion related information includes at least one of: the session ID and the session deletion reason.

Embodiment 4

Figure 7:
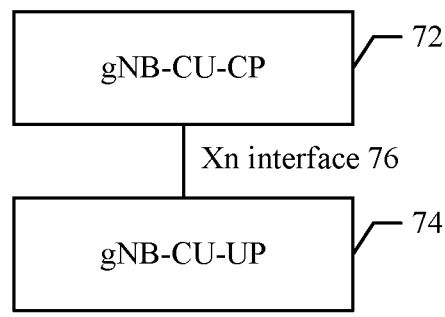
FIG. 7 is a block diagram of an entity configuration system according to an embodiment of the present disclosure.

An embodiment of the present application further provides an entity configuration system. FIG. 7 is a block diagram of an entity configuration system according to an embodiment of the present disclosure. As shown in FIG. 7, the system includes a gNB-CU-Control Plane (gNB-CU-CP) 72, a gNB-CU-User Plane (gNB-CU-UP) 74 and an Xn interface 76. The Xn interface 76 is an interface between the gNB-CU-CP 72 and the gNB-CU-UP 74. The gNB-CU-CP 72 is configured to transmit, through the Xn interface 76, specified information for configuring each packet data convergence protocol (PDCP) entity for processing a data radio bearer to the gNB-CU-UP 74. The gNB-CU-UP 74 is configured to receive the specified information and configure the each PDCP entity according to the specified information.

In the above system, the gNB-CU-UP 74 may acquire the specified information for configuring the each PDCP entity for processing the data radio bearer through the Xn interface 76 and configure the each PDCP entity according to the specified information so that configuration of a gNB-CU-UP protocol entity is implemented, thereby solving the problem of how to implement configuration of a gNB-CU-UP protocol entity and achieving centralized traffic convergence.

It is to be noted that the specified information may include at least one of: protocol data unit (PDU) session information and user plane configuration information.

It is to be noted that when the specified information includes the PDU session information, the gNB-CU-UP 74 may be further configured to determine, according to the acquired PDU session information and a correspondence between the PDU session information and the user plane configuration information, the user plane configuration information corresponding to the acquired PDU session information; and configure the each PDCP entity according to the user plane configuration information corresponding to the acquired PDU session information.

It is to be noted that when the specified information includes the user plane configuration information, the gNB-CU-UP 74 may further directly configure the each PDCP entity according to the user plane configuration information.

It is to be noted that the PDU session information may be PDU session information in one of the following flows: a PDU session establishment flow, a PDU session modification flow and a PDU session deletion flow.

In an embodiment of the present disclosure, when the PDU session information is information required to establish a PDU session in the PDU session establishment flow, the PDU session information includes at least one of: a session identifier (ID), IDs of one or more data streams in a single session, quality of service (QoS) information of non-guaranteed bit rate (non-GBR) traffic corresponding to the one or more data streams, QoS information of guaranteed bit rate (GBR) traffic corresponding to the one or more data streams, and flag information for the Xn interface to identify a terminal.

It is to be noted that after the each PDCP entity is configured according to the specified information, the gNB-CU-UP 74 is further configured to transmit a PDU session establishment success message to the gNB-CU-CP 72, or transmit a PDU session establishment failure message to the gNB-CU-CP 72. The PDU session establishment success message carries information of a successfully configured PDU session, where the information of the successfully configured PDU session includes at least one of: the session ID, IDs of one or more data streams with a user plane configuration success in the single session, the flag information for the Xn interface to identify the terminal, IDs of one or more data streams with a user plane configuration failure in the single session and a configuration failure reason. The PDU session establishment failure message includes at least one of: a user plane configuration failure reason and the flag information for the Xn interface to identify the terminal.

In an embodiment of the present disclosure, when the PDU session information is information of a PDU session to be modified in the PDU session modification flow, the PDU session information includes at least one of: a session ID, IDs of one or more data streams to be added in a single session, QoS information of non-GBR traffic corresponding to the one or more data streams to be added, QoS information of GBR traffic corresponding to the one or more data streams to be added, IDs of one or more data streams to be modified in the single session, QoS information of non-GBR traffic corresponding to the one or more data streams to be modified, QoS information of GBR traffic corresponding to the one or more data streams to be modified, IDs of one or more data streams to be deleted in the single session and the flag information for the Xn interface to identify the terminal.

It is to be noted that configuration includes at least one of addition, modification and deletion.

It is to be noted that after the each PDCP entity is configured according to the specified information, the gNB-CU-UP 74 is further configured to transmit a PDU session modification success message to the gNB-CU-CP 72, or transmit a PDU session modification failure message to the gNB-CU-CP 72. The PDU session modification success message carries information of a successfully modified PDU session, where the information of the successfully modified PDU session includes at least one of: the session ID, IDs of one or more data streams with a user plane configuration modification success in the single session, IDs of one or more data streams with a user plane configuration modification failure in the single session, a modification failure reason and the flag information for the Xn interface to identify the terminal. The PDU session modification failure message includes a user plane configuration failure reason in the PDU session and the flag information for the Xn interface to identify the terminal.

In an embodiment of the present disclosure, when the PDU session information is information of a PDU session to be deleted in the PDU session deletion flow, the PDU session information includes at least one of: a session ID, a session deletion reason and the flag information for the Xn interface to identify the terminal.

It is to be noted that after the each PDCP entity is configured according to the specified information, the gNB-CU-UP 74 is further configured to transmit a PDU session deletion success message to the gNB-CU-CP 72. The PDU session deletion success message includes at least one of: an ID of a successfully deleted session and the flag information for the Xn interface to identify the terminal. It is to be noted that the user plane configuration information may also be user plane configuration information in one of the following flows: the PDU session establishment flow, the PDU session modification flow and the PDU session deletion flow.

It is to be noted that the user plane configuration information may be transmitted through a newly defined Xn AP message in a plaintext manner, or may also be transmitted through the Xn AP message in a container manner, but it is not limited thereto.

In an embodiment of the present disclosure, the user plane configuration information is information of user plane configuration in the PDU session establishment flow, and the user plane configuration information includes at least one of: an index ID of each PDCP entity to be configured and configuration information of the each PDCP entity to be configured.

It is to be noted that the configuration information of the each PDCP entity to be configured includes at least one of: whether header compression is required for a PDCP used by the each PDCP entity to be configured, data encryption key information, a discard timer of a PDCP service data unit (SDU), radio link control (RLC) layer configuration information, medium access control (MAC) layer configuration information and physical layer configuration information.

It is to be noted that after the each PDCP entity is configured according to the specified information, the gNB-CU-UP 74 is further configured to transmit a configuration completion confirmation message to the gNB-CU-CP 72, or transmit configuration failure information to the gNB-CU-CP 72. The configuration completion confirmation message includes index information of one or more successfully configured PDCP entities. The configuration failure information includes the configuration failure reason.

It is to be noted that the gNB-CU-CP 72 is further configured to acquire PDU session related information from a core network through an NG interface, where the specified information includes the PDU session related information. The PDU session related information includes at least one of: the session ID, the IDs of the one or more data streams in the single session, the QoS information of the non-GBR traffic corresponding to the one or more data streams and the QoS information of the GBR traffic corresponding to the one or more data streams. The NG interface is an interface between the gNB-CU-UP and the core network.

In an embodiment of the present disclosure, the user plane configuration information is information of user plane configuration to be modified in the PDU session modification flow, and the user plane configuration information includes at least one of: an index ID of each PDCP entity to be added, configuration information of the each PDCP entity to be added, an index ID of each PDCP entity to be modified, configuration information of the each PDCP entity to be modified and an index ID of each PDCP entity to be deleted.

It is to be noted that the configuration information of the each PDCP entity to be added includes at least one of: whether the header compression is required for a PDCP used by the each PDCP entity to be added, the data encryption key information, the discard timer of the PDCP SDU, the RLC layer configuration information, the MAC layer configuration information and the physical layer configuration information; and the configuration information of the each PDCP entity to be modified includes at least one of: whether the header compression is required for the PDCP used by the each PDCP entity to be modified, the data encryption key information, the discard timer of the PDCP SDU, the RLC layer configuration information, the MAC layer configuration information and the physical layer configuration information.

It is to be noted that after the each PDCP entity is configured according to the specified information, the gNB-CU-UP 74 is further configured to transmit the configuration completion confirmation message to the gNB-CU-CP 72, or transmit the configuration failure information to the gNB-CU-CP 72. The configuration completion confirmation message includes index information of one or more successfully configured PDCP entities, index information of one or more PDCP entities with a configuration modification failure and the modification failure reason. The configuration failure information includes the configuration failure reason.

It is to be noted that the gNB-CU-CP 72 is further configured to acquire PDU session modification related information from the core network through the NG interface, where the specified information includes the PDU session modification related information. The PDU session modification related information includes at least one of: the session ID, the IDs of the one or more data streams to be added in the single session, the QoS information of the non-GBR traffic corresponding to the one or more data streams to be added, the QoS information of the GBR traffic corresponding to the one or more data streams to be added, the IDs of the one or more data streams to be modified in the single session, the QoS information of the non-GBR traffic corresponding to the one or more data streams to be modified, the QoS information of the GBR traffic corresponding to the one or more data streams to be modified and the IDs of the one or more data streams to be deleted in the single session.

In an embodiment of the present disclosure, the user plane configuration information is information of user configuration to be deleted in the PDU session deletion flow, and the user plane configuration information may include at least one of: an index ID of each PDCP entity to be deleted and a deletion reason.

It is to be noted that after the each PDCP entity is configured according to the specified information, the gNB-CU-UP 74 may be further configured to transmit a user plane configuration deletion success message to the gNB-CU-CP 72. The user plane configuration deletion success message includes index IDs of successfully deleted PDCP entities.

It is to be noted that the gNB-CU-CP 72 may be further configured to acquire, through the NG interface, PDU session deletion related information from the core network, where the specified information includes the PDU session deletion related information. The PDU session deletion related information is acquired by the gNB-CU-CP 72 from the core network through the NG interface, and the PDU session deletion related information includes at least one of: the session ID and the session deletion reason.

Embodiment 5

An embodiment of the present disclosure further provides a storage medium. Optionally, in this embodiment, the storage medium may be configured to store program codes for executing the steps of the method in the embodiment one.

Optionally, in this embodiment, the storage medium may include, but is not limited to, a USB flash disk, a read-only memory (ROM), a random access memory (RAM), a mobile hard disk, a magnetic disk, an optical disk or another medium capable of storing program codes.

Optionally, in this embodiment, a processor executes, according to the program codes stored in the storage medium, the steps of the method in the embodiment one.

Optionally, for specific examples in this embodiment, reference may be made to the examples described in the above-mentioned embodiments and optional embodiments, and repetition will not be made in this embodiment.

For a better understanding of the embodiments of the present disclosure, the present disclosure is further described below in conjunction with a preferred embodiment.

The preferred embodiment of the present disclosure provides two user plane configuration methods.

A method 1 includes steps described below.

In step 1, a gNB-CU-CP acquires PDU session related information from a next generation core (NGC) through an NG interface in a PDU session establishment flow. The PDU session related information includes information required to establish a PDU session, which includes, but is not limited to, one or more of: a session ID, IDs of one or more streams in a single session, QoS-related information of non-GBR traffic corresponding to the streams and QoS-related information of GBR traffic corresponding to the streams.

In step 2, the gNB-CU-CP transmits PDU session information to a gNB-CU-UP through an Xn interface in the PDU session establishment flow. The PDU session information includes the information required to establish the PDU session, which includes, but is not limited to, one or more of: the session ID, the IDs of the one or more streams in the single session, the QoS-related information of the non-GBR traffic corresponding to the streams, the QoS-related information of the GBR traffic corresponding to the streams, and flag information for the Xn interface to identify a UE.

In step 3, after receiving the PDU session related information, the gNB-CU-UP locally configures each PDCP entity carrying user plane data.

In step 4, after a local configuration success, the gNB-CU-UP may transmit a PDU session establishment success message to the gNB-CU-CP, and feed information of a successfully configured PDU session back to the gNB-CU-CP. The information of the successfully configured PDU session includes, but is not limited to, one or more of: the session ID, IDs of one or more streams with a user plane configuration success in the single session and the flag information for the Xn interface to identify the UE. In case of a local configuration failure, a PDU session establishment failure message is transmitted, which may include a user plane configuration failure reason and the flag information for the Xn interface to identify the UE.

In step 5, according to a result of step 4, the gNB-CU-CP transmits the PDU session establishment success message or the PDU session establishment failure message to the NGC through the NG interface.

When the PDU session is modified or deleted, the gNB-CU-CP also needs to notify the gNB-CU-UP of PDU session modification/deletion information through the Xn interface so that the gNB-CU-UP may update and delete local user plane configuration.

A method 2 includes steps described below.

In step 1, the gNB-CU-CP acquires the PDU session related information from the NGC through the NG interface in the PDU session establishment flow. The PDU session related information includes the information required to establish the PDU session, which includes, but is not limited to, one or more of: the session ID, the IDs of the one or more streams in the single session, the QoS-related information of the non-GBR traffic corresponding to the streams and the QoS-related information of the GBR traffic corresponding to the streams. After receiving the PDU session related information, the gNB-CU-CP configures the gNB-CU-UP to configure the each PDCP entity carrying the user plane data.

In step 2, the gNB-CU-CP transmits user plane configuration information to the gNB-CU-UP through the Xn interface. The user plane configuration information includes, but is not limited to, one or more of: an index ID of the each PDCP entity to be configured and configuration information of the each PDCP entity carrying the user plane data. The configuration information of the each PDCP entity includes, but is not limited to, one or more of: whether header compression is required, data encryption key information, a discard timer of a PDCP SDU, RLC layer configuration information, MAC layer configuration information and physical layer configuration information. The user plane configuration information may be transmitted through a newly defined Xn AP message in a plaintext manner, or may also be transmitted through the Xn AP message in a container manner.

In step 3, the gNB-CU-UP locally configures the each PDCP entity carrying the user plane data according to the received user plane configuration information.

In step 4, optionally, after receiving user plane configuration and successfully completing local configuration, the gNB-CU-UP may send a configuration completion confirmation message to the gNB-CU-CP. In case of a local configuration failure, a configuration failure message is fed back. In step 5, optionally, according to the result of step 4, the gNB-CU-CP transmits the PDU session establishment success message or the PDU session establishment failure message to the NGC through the NG interface.

When the PDU session is modified or deleted, the gNB-CU-CP also needs to notify the gNB-CU-UP of a configuration change of the each PDCP entity corresponding to PDU session modification/deletion through the Xn interface to enable the gNB-CU-UP to update and delete the local user plane configuration.

The user plane configuration methods provided by the preferred embodiment of the present disclosure are used for implementing user plane configuration and management through the defined Xn interface between the gNB-CU-CP and the gNB-CU-UP, and implementing configuration of a gNB-CU-UP protocol entity, thereby implementing centralized traffic convergence and supporting an independent user plane function while having centralized RRC/RRM functions.

DETAILED DESCRIPTION

Figure 1:
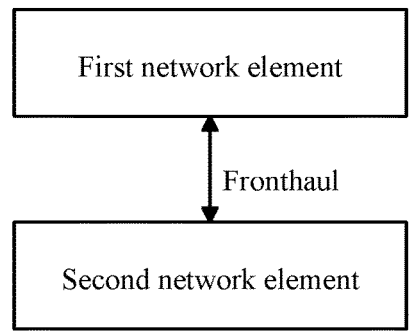
FIG. 1 is a schematic diagram of a fronthaul interface between a first network element and a second network element.

As shown in FIG. 1, information interactions are performed between a first network element and a second network element through a fronthaul interface. For different delays, the fronthaul here may be ideal or non-ideal. An ideal fronthaul has a relatively small transmission delay of, for example, tens or hundreds of microseconds. A non-ideal fronthaul has a relatively large transmission delay of, for example, milliseconds. A distinction between the ideal fronthaul and the non-ideal fronthaul results in different function divisions between the first network element and the second network element.

Figure 2:
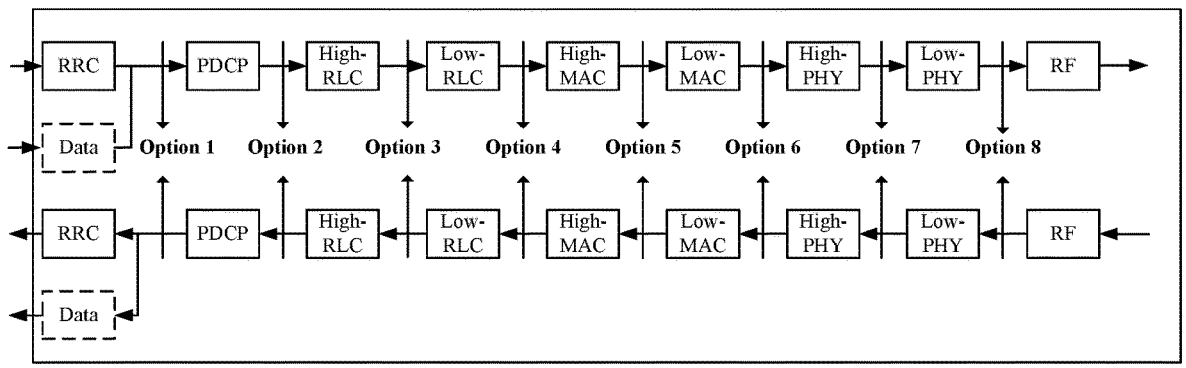
FIG. 2 is a schematic diagram of possible function divisions between a first network element and a second network element.

As shown in FIG. 2, possible function divisions are implemented as follows:

In an option 1 (RRC separated from PDCP, similar to a 1A structure), function separation is similar to the 1A structure in dual connectivity (DC). RRC is located in a CU, and functions such as PDCP, RLC, MAC, PHY and RF are located in a DU. That is, an entire UP is located in the DU.

In an option 2 (PDCP separated from RLC), function separation is similar to a 3C structure in the DC. RRC and PDCP are located in the CU, and functions such as RLC, MAC, PHY and RF are located in the DU.

In an option 3 (high-RLC separated from low-RLC), low-RLC (part of functions of RLC), MAC, PHY and part of RF are located in the DU, and functions such as PDCP and high-RLC (part of the functions of RLC) are located in the CU.

In an option 4 (RLC separated from MAC), MAC, PHY and part of RF are located in the DU, and functions such as PDCP and RLC are located in the CU.

In an option 5 (internal separation in MAC), part of functions of MAC (such as HARQ), PHY and part of RF are located in the DU, and other upper layer functions are located in the CU.

In an option 6 (MAC separated from PHY), MAC, PHY and part of RF are located in the DU, and functions such as PDCP and RLC are located in the CU.

In an option 7 (internal separation in PHY), part of the functions of MAC (such as HARQ), PHY and part of RF are located in the DU, and the other upper layer functions are located in the CU.

In an option 8 (PHY separated from RF), part of RF are located in the DU, and the other upper layer functions are located in the CU.

As shown in FIG. 3, a control plane PDCP entity and a user plane PDCP entity are located in two different CUs. For convenience of description, the two CUs are referred to as a gNB-CU-CP and a gNB-CU-UP, thereby separating user plane data from control plane data. Assuming that an Xn interface exists between the gNB-CU-CP and the gNB-CU-UP, a fronthaul interface NGx exists between the CU and the DU, an interface between the gNB-CU-CP and the DU is referred to as NGx-C, and an interface between the gNB-CU-UP and the DU is referred to as NGx-U.

Preferred Embodiment One

Figure 8:
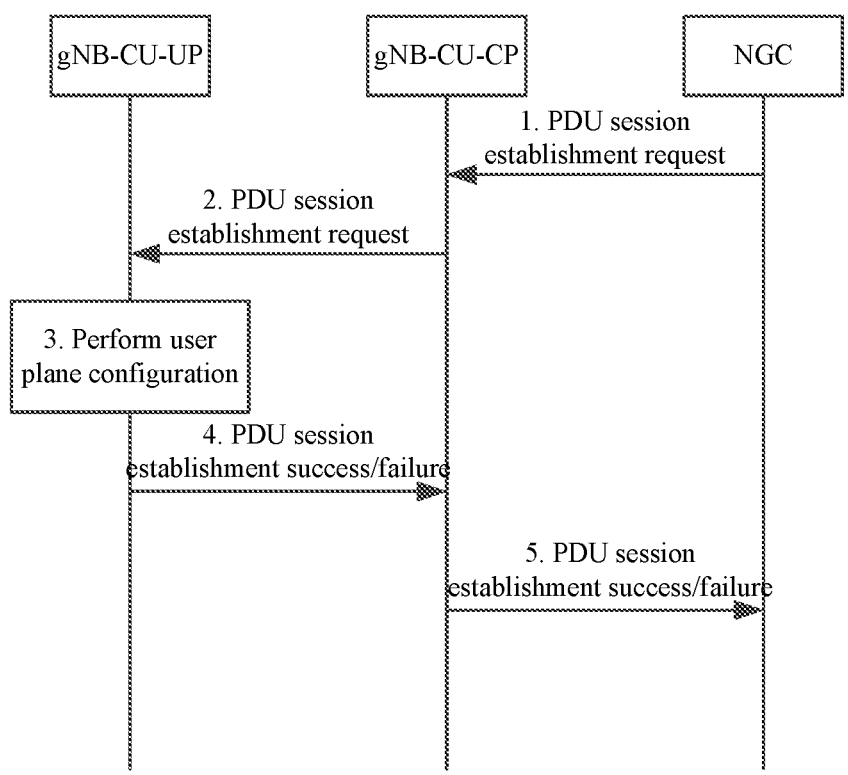
FIG. 8 is a flowchart of a method according to a preferred embodiment one of the present disclosure.

FIG. 8 is a flowchart of a method according to a preferred embodiment one of the present disclosure. A gNB-CU-UP performs configuration itself when a PDU session is established. As shown in FIG. 8, the method includes steps described below.

In step 1, a gNB-CU-CP acquires PDU session related information from an NGC through an NG interface in a PDU session establishment flow. The PDU session related information includes information required to establish the PDU session, which includes, but is not limited to, one or more of: a session ID, IDs of one or more streams in a single session, QoS-related information of non-GBR traffic corresponding to the streams and QoS-related information of GBR traffic corresponding to the streams.

In step 2, the gNB-CU-CP transmits PDU session information to the gNB-CU-UP through an Xn interface in the PDU session establishment flow. The PDU session information includes the information required to establish the PDU session, which includes, but is not limited to, one or more of: the session ID, the IDs of the one or more streams in the single session, the QoS-related information of the non-GBR traffic corresponding to the streams, the QoS-related information of the GBR traffic corresponding to the streams, and flag information for the Xn interface to identify a UE.

In step 3, after receiving the PDU session related information, the gNB-CU-UP locally configures each PDCP entity carrying user plane data.

In step 4, after a local configuration success, the gNB-CU-UP may transmit a PDU session establishment success message to the gNB-CU-CP, and feed information of a successfully configured PDU session back to the gNB-CU-CP. The information of the successfully configured PDU session includes, but is not limited to, one or more of: the session ID, IDs of one or more streams with a user plane configuration success in the single session and the flag information for the Xn interface to identify the UE. In case of a local configuration failure, a PDU session establishment failure message is transmitted, which may include a user plane configuration failure reason and the flag information for the Xn interface to identify the UE.

In step 5, according to a result of step 4, the gNB-CU-CP transmits the PDU session establishment success message or the PDU session establishment failure message to the NGC through the NG interface.

Preferred Embodiment Two

Figure 9:
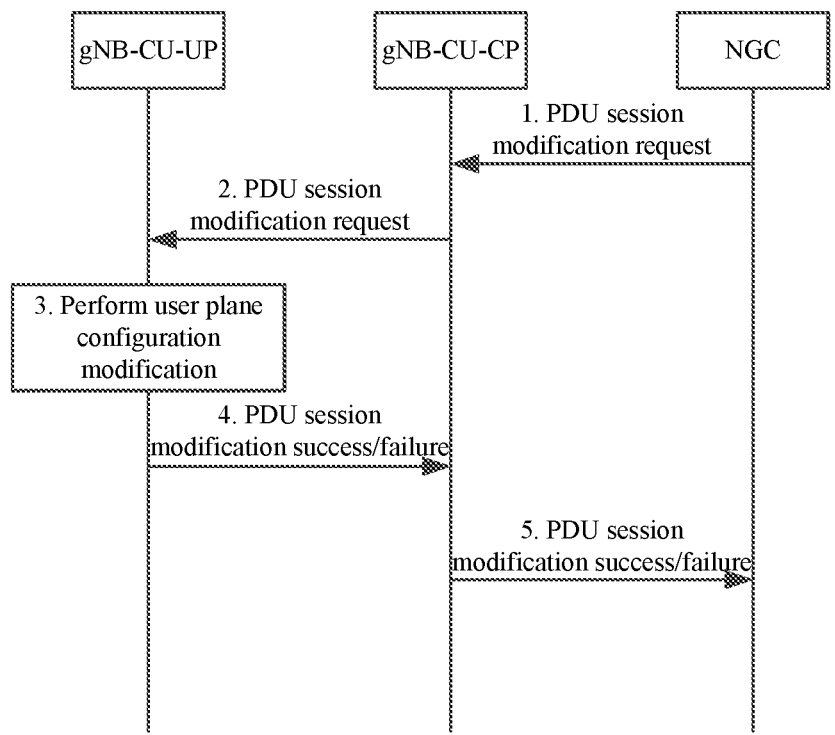
FIG. 9 is a flowchart of a method according to a preferred embodiment two of the present disclosure.

FIG. 9 is a flowchart of a method according to a preferred embodiment two of the present disclosure. A gNB-CU-UP performs configuration itself when a PDU session is modified. As shown in FIG. 9, the method includes steps described below. In step 1, a gNB-CU-CP acquires PDU session modification related information from an NGC through an NG interface in a PDU session modification flow. The PDU session modification related information includes information required to modify the PDU session, which includes, but is not limited to, one or more of: a session ID, IDs of one or more streams to be added in a single session, QoS-related information of non-GBR traffic corresponding to the streams to be added, QoS-related information of GBR traffic corresponding to the streams to be added, IDs of one or more streams to be modified in the single session, QoS-related information of non-GBR traffic corresponding to the streams to be modified, QoS-related information of GBR traffic corresponding to the streams to be modified and IDs of one or more streams to be deleted in the single session.

In step 2, the gNB-CU-CP transmits information of the PDU session to be modified to the gNB-CU-UP through an Xn interface in the PDU session modification flow. The information of the PDU session to be modified includes information required to establish the PDU session, which includes, but is not limited to, one or more of: the session ID, the IDs of the one or more streams to be added in the single session, the QoS-related information of the non-GBR traffic corresponding to the streams to be added, the QoS-related information of the GBR traffic corresponding to the streams to be added, the IDs of the one or more streams to be modified in the single session, the QoS-related information of the non-GBR traffic corresponding to the streams to be modified, the QoS-related information of the GBR traffic corresponding to the streams to be modified, the IDs of the one or more streams to be deleted in the single session and flag information for the Xn interface to identify a UE.

In step 3, after receiving the PDU session modification related information, the gNB-CU-UP locally performs configuration modification on one or more PDCP entities carrying user plane data, such as addition, modification or deletion.

In step 4, after a local configuration success, the gNB-CU-UP may transmit a PDU session modification success message to the gNB-CU-CP, and feed information of a successfully modified PDU session back to the gNB-CU-CP. The information of the successfully modified PDU session includes, but is not limited to, one or more of: the session ID, IDs of one or more streams with a user plane configuration modification success in the single session, IDs of one or more streams with a user plane configuration modification failure in the single session, a modification failure reason. In case of a local configuration failure, a PDU session modification failure message is transmitted, which may include a user plane configuration failure reason of the PDU session and the flag information for the Xn interface to identify the UE.

In step 5, according to a result of step 4, the gNB-CU-CP transmits the PDU session modification success message or the PDU session modification failure message to the NGC through the NG interface.

Preferred Embodiment Three

Figure 10:
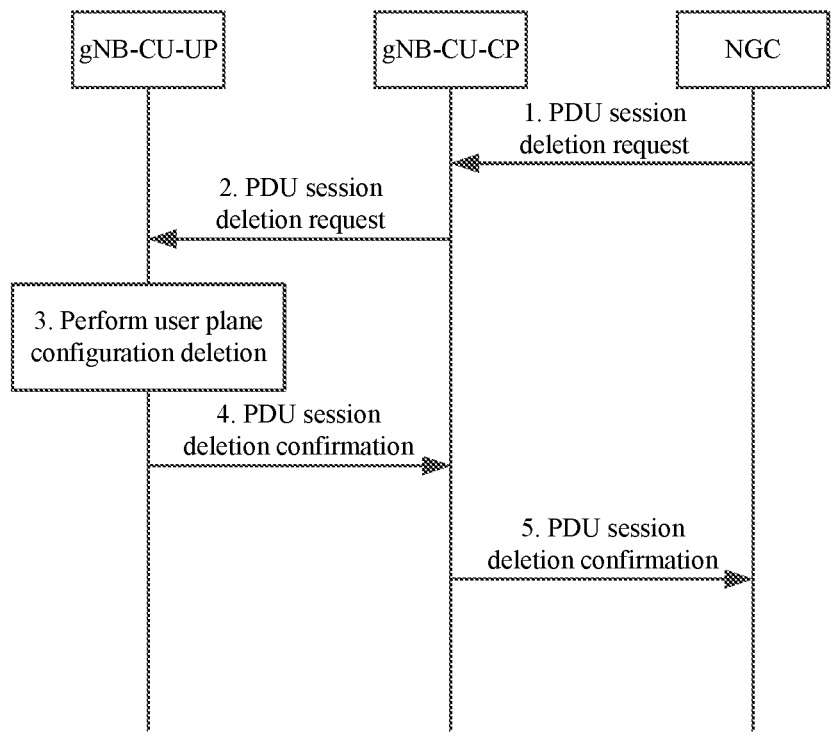
FIG. 10 is a flowchart of a method according to a preferred embodiment three of the present disclosure.

FIG. 10 is a flowchart of a method according to a preferred embodiment three of the present disclosure. A gNB-CU-UP performs configuration itself when a PDU session is deleted. As shown in FIG. 10, the method includes steps described below.

In step 1, a gNB-CU-CP acquires PDU session related information from an NGC through an NG interface in a PDU session deletion flow. The PDU session related information includes information required to delete the PDU session, which includes, but is not limited to, one or more of: a session ID and a session deletion reason.

In step 2, the gNB-CU-CP transmits information of the PDU session to be deleted to the gNB-CU-UP through an Xn interface in the PDU session deletion flow. The information of the PDU session to be deleted includes, but is not limited to, one or more of: the session ID, the session deletion reason and flag information for the Xn interface to identify a UE.

In step 3, after receiving PDU session deletion related information, the gNB-CU-UP locally deletes a corresponding PDCP entity.

In step 4, after a local configuration success, the gNB-CU-UP may transmit a PDU session deletion success message to the gNB-CU-CP. The PDU session deletion success message includes, but is not limited to, one or more of: an ID of a successfully deleted session and the flag information for the Xn interface to identify the UE.

In step 5, according to a result of step 4, the gNB-CU-CP transmits a PDU session deletion confirmation message to the NGC through the NG interface.

Preferred Embodiment Four

Figure 11:
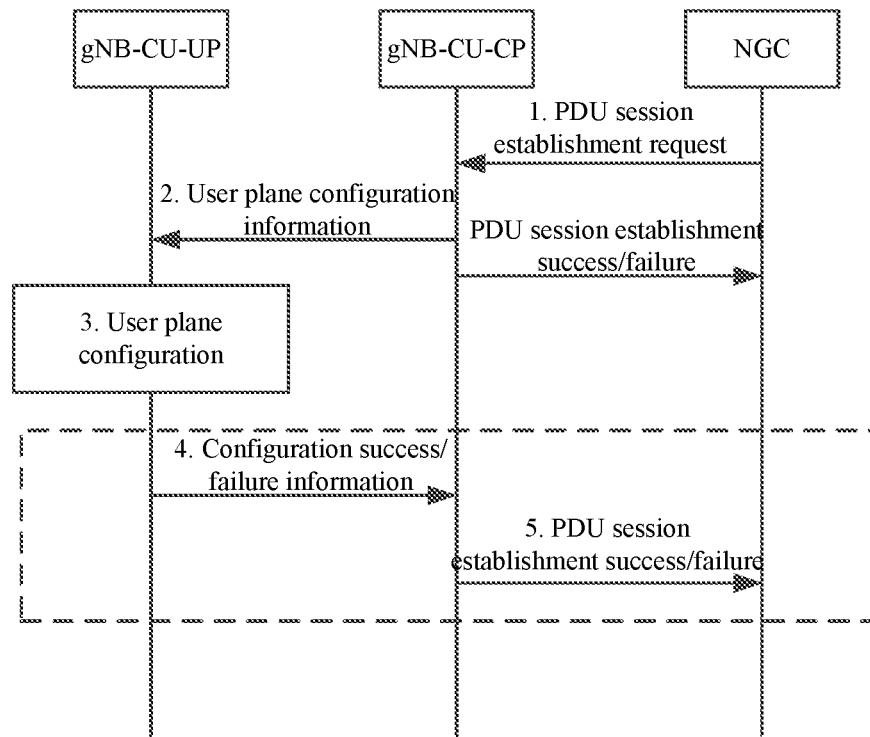
FIG. 11 is a flowchart of a method according to a preferred embodiment four of the present disclosure.

FIG. 11 is a flowchart of a method according to a preferred embodiment four of the present disclosure. A gNB-CU-CP configures a gNB-CU-UP when a PDU session is established. As shown in FIG. 11, the method includes steps described below.

In step 1, the gNB-CU-CP acquires PDU session related information from an NGC through an NG interface in a PDU session establishment flow. The PDU session related information includes information required to establish the PDU session, which includes, but is not limited to, one or more of: a session ID, IDs of one or more streams in a single session, QoS-related information of non-GBR traffic corresponding to the streams and QoS-related information of GBR traffic corresponding to the streams. After receiving the PDU session related information, the gNB-CU-CP configures the gNB-CU-UP to configure each PDCP entity carrying user plane data.

In step 2, the gNB-CU-CP transmits user plane configuration information to the gNB-CU-UP through an Xn interface. The user plane configuration information includes, but is not limited to, one or more of: an index ID of the each PDCP entity to be configured and configuration information of the each PDCP entity carrying the user plane data. The configuration information of the each PDCP entity includes, but is not limited to, one or more of: whether header compression is required, data encryption key information, a discard timer of a PDCP SDU, RLC layer configuration information, MAC layer configuration information and physical layer configuration information. The user plane configuration information may be transmitted through a newly defined Xn AP message in a plaintext manner, or may also be transmitted through the Xn AP message in a container manner.

In step 3, the gNB-CU-UP locally configures the each PDCP entity carrying the user plane data according to the received user plane configuration information.

In step 4, optionally, after receiving user plane configuration and successfully completing local configuration, the gNB-CU-UP may transmit a configuration completion confirmation message to the gNB-CU-CP. The configuration completion confirmation message includes index information of one or more successfully configured PDCP entities so that a stream or session corresponding to these PDCP entities can be locally indexed by the gNB-CU-CP. In case of a local configuration failure, a configuration failure message which may include a configuration failure reason is fed back.

In step 5, optionally, according to a result of step 4, the gNB-CU-CP transmits a PDU session establishment success message or a PDU session establishment failure message to the NGC through the NG interface.

Preferred Embodiment Five

Figure 12:
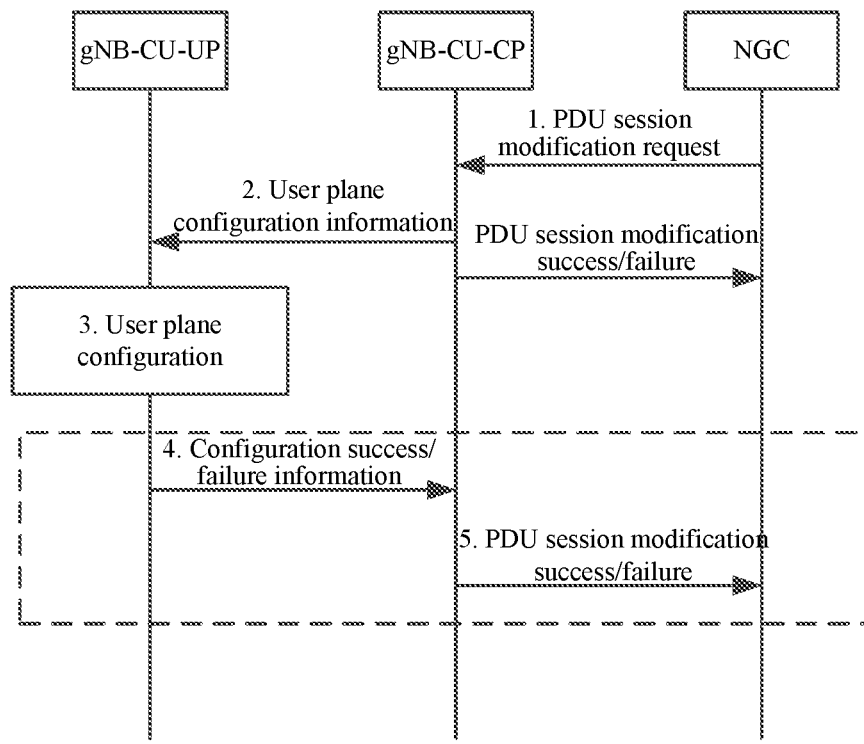
FIG. 12 is a flowchart of a method according to a preferred embodiment five of the present disclosure.

FIG. 12 is a flowchart of a method according to a preferred embodiment five of the present disclosure. A gNB-CU-CP configures a gNB-CU-UP when a PDU session is modified. As shown in FIG. 12, the method includes steps described below.

In step 1, the gNB-CU-CP acquires PDU session modification related information from an NGC through an NG interface in a PDU session modification flow. The PDU session modification related information includes information required to modify the PDU session, which includes, but is not limited to, one or more of: a session ID, IDs of one or more streams to be added in a single session, QoS-related information of non-GBR traffic corresponding to the streams to be added, QoS-related information of GBR traffic corresponding to the streams to be added, IDs of one or more streams to be modified in the single session, QoS-related information of non-GBR traffic corresponding to the streams to be modified, QoS-related information of GBR traffic corresponding to the streams to be modified and IDs of one or more streams to be deleted in the single session.

In step 2, the gNB-CU-CP transmits information of user plane configuration to be modified to the gNB-CU-UP through an Xn interface. The information of user plane configuration to be modified includes, but is not limited to, one or more of: an index ID of each PDCP entity to be added, configuration information of the each PDCP entity to be added, an index ID of each PDCP entity to be modified, configuration information of the each PDCP entity to be modified and an index ID of each PDCP entity to be deleted. Configuration information of each PDCP entity carrying user plane data includes, but is not limited to, one or more of: whether header compression is required, data encryption key information, a discard timer of a PDCP SDU, RLC layer configuration information, MAC layer configuration information and physical layer configuration information. The user plane configuration information may be transmitted through a newly defined Xn AP message in a plaintext manner, or may also be transmitted through the Xn AP message in a container manner.

In step 3, the gNB-CU-UP locally configures the each PDCP entity carrying the user plane data according to the received information of user plane configuration to be modified.

In step 4, optionally, after receiving user plane configuration and successfully completing local configuration, the gNB-CU-UP may transmit a configuration completion confirmation message to the gNB-CU-CP. The configuration completion confirmation message includes index information of one or more successfully configured PDCP entities, index information of one or more PDCP entities with a configuration modification failure and a modification failure reason. In case of a local configuration failure, a configuration failure message which may include a configuration failure reason is fed back.

In step 5, optionally, according to a result of step 4, the gNB-CU-CP transmits a PDU session establishment success message or a PDU session establishment failure message to the NGC through the NG interface.

Preferred Embodiment Six

Figure 13:
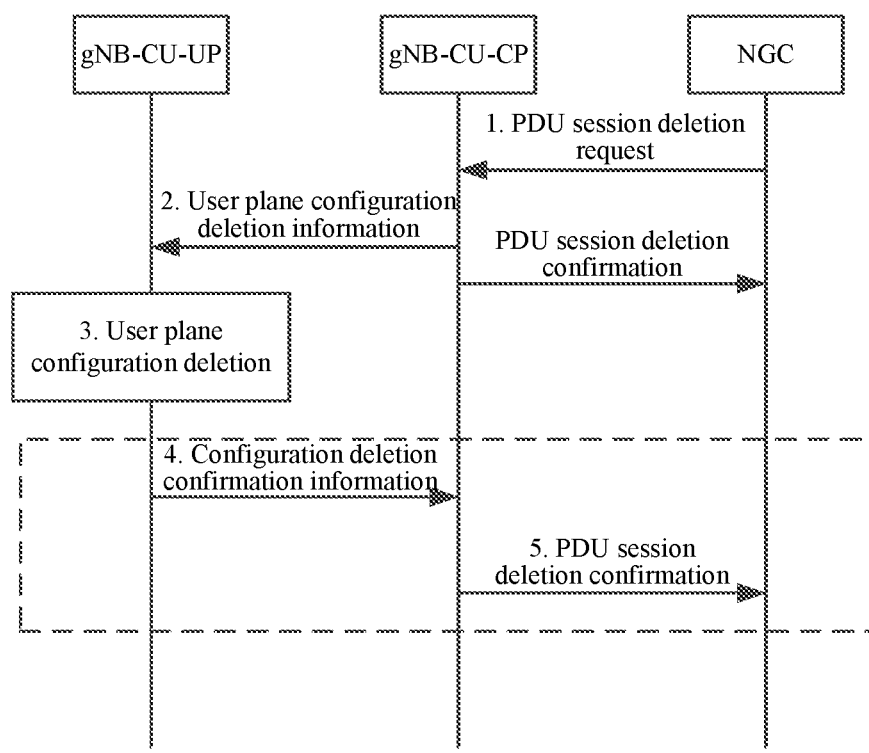
FIG. 13 is a flowchart of a method according to a preferred embodiment six of the present disclosure.

FIG. 13 is a flowchart of a method according to a preferred embodiment six of the present disclosure. A gNB-CU-CP configures a gNB-CU-UP when a PDU session is deleted. As shown in FIG. 13, the method includes steps described below.

In step 1, the gNB-CU-CP acquires PDU session related information from an NGC through an NG interface in a PDU session deletion flow. The PDU session related information includes information required to delete the PDU session, which includes, but is not limited to, one or more of: a session ID and a session deletion reason.

In step 2, the gNB-CU-CP transmits information of user plane configuration to be deleted to the gNB-CU-UP through an Xn interface. The information of user plane configuration to be deleted includes, but is not limited to, one or more of: an index ID of each PDCP entity to be deleted and a deletion reason. The user plane configuration information may be transmitted through a newly defined Xn AP message in a plaintext manner, or may also be transmitted through the Xn AP message in a container manner.

In step 3, the gNB-CU-UP locally deletes a corresponding PDCP entity according to the received user plane configuration information.

In step 4, optionally, after a local configuration success, the gNB-CU-UP may transmit a user plane configuration deletion success message to the gNB-CU-CP. The user plane configuration deletion success message includes, but is not limited to, one or more of: index IDs of successfully deleted PDCP entities.

In step 5, optionally, according to a result of step 4, the gNB-CU-CP transmits a PDU session deletion confirmation message to the NGC through the NG interface.

In the specific embodiments 4, 5 and 6, assuming that the gNB-CU-UP can completely perform the local configuration according to a request from the gNB-CU-CP, step 5 may also be performed after step 2.

Apparently, it should be understood by those skilled in the art that each of the above-mentioned modules or steps of the present disclosure may be implemented by a general-purpose computing device, the modules or steps may be concentrated on a single computing device or distributed on a network composed of multiple computing devices, and alternatively, the modules or steps may be implemented by program codes executable by the computing device, so that the modules or steps may be stored in a storage device and executed by the computing device. In some circumstances, the illustrated or described steps may be executed in sequences different from those described herein, or the modules or steps may be made into various integrated circuit modules separately, or multiple modules or steps therein may be made into a single integrated circuit module for implementation. In this way, the present disclosure is not limited to any specific combination of hardware and software.

The above are only preferred embodiments of the present disclosure and are not intended to limit the present disclosure, and for those skilled in the art, the present disclosure may have various modifications and variations. Any modifications, equivalent substitutions, improvements and the like made within the spirit and principle of the present disclosure fall within the scope of the present disclosure.

We claim:

1. An entity configuration method, comprising:
   acquiring specified information for configuring each packet data convergence protocol (PDCP) entity for processing a data radio bearer; and
   configuring the each PDCP entity according to the specified information; wherein the specified information comprises protocol data unit (PDU) session information and user plane configuration information;
   wherein the user plane configuration information is information of user plane configuration of a PDU session establishment flow, and the user plane configuration information comprises configuration information of the each PDCP entity to be configured.

2. The entity configuration method of claim 1, wherein the specified information is acquired through an Xn interface and the Xn interface is an interface between a gNB-CU-Control Plane, gNB-CU-CP, and a gNB-CU-User Plane, gNB-CU-UP.

3. The entity configuration method of claim 1, further comprising:
   determining, according to the acquired PDU session information and a correspondence between the PDU session information and the user plane configuration information, the user plane configuration information corresponding to the acquired PDU session information.

4. The entity configuration method of claim 1, wherein in condition that the PDU session information is information required to establish a PDU session in the PDU session establishment flow, the PDU session information comprises at least one of: a session identifier (ID), IDs of one or more data streams in a single session, quality of service (QoS) information of non-guaranteed bit rate (non-GBR) traffic corresponding to the one or more data streams, QoS information of guaranteed bit rate (GBR) traffic corresponding to the one or more data streams, and flag information for an Xn interface between a gNB-CU-CP and a gNB-CU-UP to identify a terminal.

5. The entity configuration method of claim 4, wherein after the configuring the each PDCP entity according to the specified information, the method further comprises:
   transmitting a PDU session establishment success message to the gNB-CU-CP, wherein the information of the successfully configured PDU session comprises the session ID, IDs of one or more data streams with a user plane configuration success in the single session, and the flag information for the Xn interface to identify the terminal; or
   transmitting a PDU session establishment failure message to the gNB-CU-CP, wherein the PDU session establishment failure message comprises at least one of: a user plane configuration failure reason and the flag information for the Xn interface to identify the terminal.

6. The entity configuration method of claim 1, wherein in condition that the PDU session information is information of a PDU session to be modified in a PDU session modification flow, the PDU session information comprises at least one of: a session ID, IDs of one or more data streams to be added in a single session, QoS information of non-GBR traffic corresponding to the one or more data streams to be added, QoS information of GBR traffic corresponding to the one or more data streams to be added, IDs of one or more data streams to be modified in the single session, QoS information of non-GBR traffic corresponding to the one or more data streams to be modified, QoS information of GBR traffic corresponding to the one or more data streams to be modified, IDs of one or more data streams to be deleted in the single session and flag information for an Xn interface between a gNB-CU-CP and a gNB-CU-UP to identify a terminal.

7. The entity configuration method of claim 6, wherein after the configuring the each PDCP entity according to the specified information, the method further comprises:
   transmitting a PDU session modification success message to the gNB-CU-CP, wherein the information of the successfully modified PDU session comprises: the session ID, IDs of one or more data streams with a user plane configuration modification success in the single session, and the flag information for the Xn interface to identify the terminal; or
   transmitting a PDU session modification failure message to the gNB-CU-CP, wherein the PDU session modification failure message comprises a user plane configuration failure reason in the PDU session and the flag information for the Xn interface to identify the terminal.

8. A gNB-CU-User Plane (gNB-CU-UP), comprising:
   a radio frequency (RF) module, which is configured to acquire specified information for configuring each packet data convergence protocol (PDCP) entity for processing a data radio bearer; and
   a processor, which is configured to configure the each PDCP entity according to the specified information;
   wherein the specified information comprises protocol data unit (PDU) session information and user plane configuration information;
   wherein the user plane configuration information is information of user plane configuration of a PDU session establishment flow, and the user plane configuration information comprises configuration information of the each PDCP entity to be configured.

9. The gNB-CU-UP of claim 8, wherein the RF module is configured to acquire the specified information through an Xn interface and the Xn interface is an interface between a gNB-CU-Control Plane, gNB-CU-CP, and the gNB-CU-UP.

10. The gNB-CU-UP of claim 8, wherein the processor is further configured to determine, according to the acquired PDU session information and a correspondence between the PDU session information and the user plane configuration information, the user plane configuration information corresponding to the acquired PDU session information.

11. The gNB-CU-UP of claim 8, wherein in condition that the PDU session information is information required to establish a PDU session in the PDU session establishment flow, the PDU session information comprises at least one of: a session identifier (ID), IDs of one or more data streams in a single session, quality of service (QoS) information of non-guaranteed bit rate (non-GBR) traffic corresponding to the one or more data streams, QoS information of guaranteed bit rate (GBR) traffic corresponding to the one or more data streams, and flag information for an Xn interface between a gNB-CU-Control Plane, gNB-CU-CP, and the gNB-CU-UP to identify a terminal.

12. The gNB-CU-UP of claim 11, wherein after the each PDCP entity is configured according to the specified information, the RF module is further configured to transmit a PDU session establishment success message to the gNB-CU-CP, wherein the information of the successfully configured PDU session comprises the session ID, IDs of one or more data streams with a user plane configuration success in the single session, and the flag information for the Xn interface to identify the terminal; or transmit a PDU session establishment failure message to the gNB-CU-CP, wherein the PDU session establishment failure message comprises at least one of: a user plane configuration failure reason and the flag information for the Xn interface to identify the terminal.

13. The gNB-CU-UP of claim 8, wherein in condition that the PDU session information is information of a PDU session to be modified in a PDU session modification flow, the PDU session information comprises at least one of: a session ID, IDs of one or more data streams to be added in a single session, QoS information of non-GBR traffic corresponding to the one or more data streams to be added, QoS information of GBR traffic corresponding to the one or more data streams to be added, IDs of one or more data streams to be modified in the single session, QoS information of non-GBR traffic corresponding to the one or more data streams to be modified, QoS information of GBR traffic corresponding to the one or more data streams to be modified, IDs of one or more data streams to be deleted in the single session and flag information for an Xn interface between a gNB-CU-Control Plane, gNB-CU-CP, and the gNB-CU-UP to identify a terminal.

14. The gNB-CU-UP of claim 13, wherein after the each PDCP entity is configured according to the specified information, the RF module is further configured to transmit a PDU session modification success message to the gNB-CU-CP, wherein the information of the successfully modified PDU session comprises: the session ID, IDs of one or more data streams with a user plane configuration modification success in the single session, and the flag information for the Xn interface to identify the terminal; or transmit a PDU session modification failure message to the gNB-CU-CP, wherein the PDU session modification failure message comprises a user plane configuration failure reason in the PDU session and the flag information for the Xn interface to identify the terminal.

* * * * *